United States Patent
Shin et al.

(10) Patent No.: US 11,535,268 B2
(45) Date of Patent: Dec. 27, 2022

(54) VEHICLE AND CONTROL METHOD THEREOF

(71) Applicants: Hyundai Motor Company, Seoul (KR); Kia Motors Corporation, Seoul (KR)

(72) Inventors: Huiwon Shin, Gyeonggi-do (KR); Singu Kim, Gyeonggi-do (KR); Dong Woo Kim, Gyeonggi-do (KR); Sang Woo Ji, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 419 days.

(21) Appl. No.: 16/701,254

(22) Filed: Dec. 3, 2019

(65) Prior Publication Data

US 2020/0216088 A1  Jul. 9, 2020

(30) Foreign Application Priority Data

Jan. 7, 2019  (KR) .................. 10-2019-0001745

(51) Int. Cl.

| | |
|---|---|
| *G06K 9/00* | (2022.01) |
| *B60W 50/08* | (2020.01) |
| *G10L 15/22* | (2006.01) |
| *G06F 3/01* | (2006.01) |
| *B60K 35/00* | (2006.01) |
| *G06V 40/16* | (2022.01) |
| *B60W 50/14* | (2020.01) |

(52) U.S. Cl.
CPC .......... *B60W 50/085* (2013.01); *B60K 35/00* (2013.01); *G06F 3/017* (2013.01); *G06V 40/165* (2022.01); *G10L 15/22* (2013.01); *B60K 2370/1476* (2019.05); *B60W 2050/146* (2013.01)

(58) Field of Classification Search
CPC ...................................................... G06F 3/017
See application file for complete search history.

(56) References Cited

U.S. PATENT DOCUMENTS

| 8,301,108 | B2 * | 10/2012 | Naboulsi | G06F 17/00 |
|---|---|---|---|---|
| | | | | 340/576 |
| 2006/0192775 | A1 * | 8/2006 | Nicholson | G06F 3/013 |
| | | | | 345/211 |
| 2012/0257121 | A1 * | 10/2012 | Yeh | G06F 3/017 |
| | | | | 348/734 |
| 2013/0179162 | A1 * | 7/2013 | Merschon | G06F 3/0304 |
| | | | | 704/E15.001 |
| 2013/0321265 | A1 * | 12/2013 | Bychkov | G06F 3/017 |
| | | | | 345/156 |
| 2014/0365928 | A1 * | 12/2014 | Boelter | G06F 3/04847 |
| | | | | 715/765 |
| 2015/0109191 | A1 * | 4/2015 | Johnson | G02B 27/017 |
| | | | | 345/156 |

(Continued)

*Primary Examiner* — Hadi Akhavannik
(74) *Attorney, Agent, or Firm* — Fox Rothschild LLP (57) ABSTRACT

A vehicle is provided and includes a gesture detector that detects a gesture of a driver to designate a manipulation target object and a voice recognizer that recognizes a voice command generated by the driver to operate the designated manipulation target object. A controller is configured to transmit a control signal corresponding to the voice command to the manipulation target object, and to operate the manipulation target object to perform an operation corresponding to the voice command.

15 Claims, 6 Drawing Sheets

(56) References Cited

U.S. PATENT DOCUMENTS

| | | | |
|---|---|---|---|
| 2015/0175172 A1* | 6/2015 | Truong | B60W 50/16 |
| | | | 701/36 |
| 2016/0320838 A1* | 11/2016 | Teller | G06F 3/167 |
| 2017/0013950 A1* | 1/2017 | Rieger | F16M 13/04 |
| 2017/0147074 A1* | 5/2017 | Buttolo | B60N 2/02 |
| 2018/0079427 A1* | 3/2018 | Herz | B60W 50/14 |
| 2021/0039589 A1* | 2/2021 | Moeller | B60R 25/04 |
| 2021/0039599 A1* | 2/2021 | Moeller | G08B 21/182 |

* cited by examiner

VEHICLE AND CONTROL METHOD THEREOF

CROSS-REFERENCE TO RELATED APPLICATION(S)

This application is based on and claims priority under 35 U.S.C. § 119 to Korean Patent Application No. KR10-2019-0001745, filed on Jan. 7, 2019, the disclosure of which is incorporated herein by reference.

BACKGROUND

1. Technical Field

The present invention relates to a vehicle, and more particularly, to a user interface of the vehicle.

2. Description of the Related Art

A user interface of a vehicle is mainly operated while a driver is operating the vehicle. Therefore, when designing the user interface of the vehicle, it is necessary to consider safe driving. The user interface of the vehicle may be classified into physical buttons (switches), touch displays, and voice commands.

The physical buttons (switches) are limited in expandability due to the limited space (area) within the vehicle. The touch displays involve complex stages of screen transition to implement many menus in a limited display area. Therefore, to secure safe driving, the number of screen transitions must be reduced and simplified, so the expandability of the touch displays is limited. Although the voice commands are more expandable than the physical buttons or the touch displays, many voice commands make it difficult for the driver to learn and utilize the many voice commands. Accordingly, high expandability of the voice commands is rather a cause for lowering the utilization of the voice commands.

SUMMARY

According to an aspect of the present invention, an object of the present invention is to provide an improved user interface of a vehicle by implementing the user interface using a combination of a driver's gesture and voice commands.

An aspect of the present invention provides a vehicle that may include: a gesture detector configured to detect a gesture of a driver to designate a manipulation target object; a voice recognizer configured to recognize a voice command generated by the driver to operate the designated manipulation target object; and a controller configured to transmit a control signal that corresponds to the voice command to the manipulation target object, and to operate the manipulation target object to perform an operation that corresponds to the voice command.

The gesture detector may be a three-dimensional (3D) camera configured to detect a position and a posture of the driver. The gesture detector may be configured to detect positions and postures of at least two different body parts of the driver. The gesture detector may also be configured to detect the manipulation target object located on an extension line of a straight line that virtually connects the at least two different body parts of the driver. The at least two different body parts of the driver may include an eye and a hand of the driver.

Another aspect of the present invention provides a method of controlling a vehicle that may include: detecting, by a gesture detector, a gesture of a driver to designate a manipulation target object; recognizing, by a voice recognizer, a voice command generated by the driver to operate the designated manipulation target object; and transmitting, by a controller, a control signal that corresponds to the voice command to the manipulation target object, and operating the manipulation target object to perform an operation that corresponds to the voice command.

The detecting of the gesture may include detecting a position and a posture of the driver using a 3D camera. In addition, the detecting of the gesture may include detecting positions and postures of at least two different body parts of the driver and detecting the manipulation target object located on an extension line of a straight line that virtually connects the at least two different body parts of the driver. The at least two different body parts of the driver includes an eye and a hand of the driver.

The method may further include receiving the voice command again when the manipulation target object and the voice command are in discord each other and detecting the gesture of the driver again when the manipulation target object and the voice command are in discord with each other. In addition, the method may include outputting the voice command correlated with the manipulation target object to the driver when the manipulation target object and the voice command are in discord with each other. The method may also include outputting the voice command correlated with the manipulation target object to the driver when the manipulation target object and the voice command are in discord each other; and guiding the driver to select either re-input of the voice command or re-detection of the gesture.

Yet another aspect of the present invention provides a vehicle that may include: a 3D camera configured to detect a manipulation target object located on an extension line of a straight line that virtually connects an eye and a hand of a driver; a voice recognizer configured to recognize a voice command generated by the driver to operate a designated manipulation target object; and a controller configured to transmit a control signal that corresponds to the voice command to the manipulation target object, and to operate the manipulation target object to perform an operation that corresponds to the voice command.

Another aspect of the present invention provides a method of controlling a vehicle that may include: starting, by a voice recognizer, voice recognition; detecting, by a gesture detector, a manipulation target object located on an extension line of a straight line that virtually connects an eye and a hand of a driver; recognizing, by the voice recognizer, a voice command generated by the driver to operate a designated manipulation target object; outputting, by a controller, the voice command correlated with the manipulation target object to the driver, and guiding the driver to select at least one of re-input of the voice command and re-detection of a gesture, thereby performing at least one of the voice recognition and the gesture detection; and transmitting, by the controller, a control signal that corresponds to the voice command to the manipulation target object, and operating the manipulation target object to perform an operation that corresponds to the voice command, when the manipulation target object and the voice command correspond to each other.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 1:
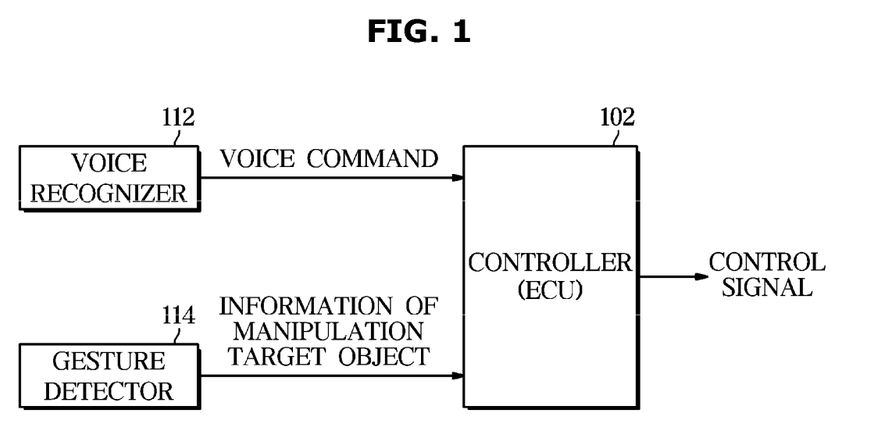
FIG. 1 is a view illustrating a control system of a vehicle according to an exemplary embodiment of the present invention.

FIG. 1 is a view illustrating a control system of a vehicle according to an exemplary embodiment of the present invention. The control system of the vehicle shown in FIG. 1 is for implementing a multi-modal user interface according to an exemplary embodiment of the present invention. As shown in FIG. 1, a voice recognizer 112 and a gesture detector 114 may be connected to an input side of a controller (ECU) 102 to communicate with each other.

The voice recognizer 112 may be configured to recognize a voice command by analyzing a voice signal generated by a driver's speech (utterance), and transmit the recognized voice command to the controller 102. Voice recognition technology is used for voice recognition of the voice recognizer 112. The voice recognition technology converts acoustic speech signals acquired through acoustic sensors such as microphones into words or sentences. In the voice recognition technology, voice recognition is implemented by extracting an acoustic signal, removing noise, and comparing features of the speech signals with data in a speech model database. The voice command generated as described above may be used to operate various devices provided within the vehicle according to the exemplary embodiment of the present invention.

The gesture detector 114 may be configured to detect a position and posture of a driver 202, generate information regarding a manipulation target object based on the detected position and posture of the driver 202, and transmit the generated information of the manipulation target object to the controller 102. The manipulation target object refers to a device or an apparatus or a function of the vehicle that the driver intends to manipulate (or operate). The gesture detector 114 may be configured to recognize the manipulation target object to be operated by the driver by analysis of the position and posture of the driver. For example, whether the driver points to a multimedia device of the vehicle or the driver points to a window operation switch provided in a door may be detect by the analysis of the position and posture of the driver. The gesture detector 114 may be a 3D camera or a 3D depth camera. The 3D camera configuring the gesture detector 114 may be implemented in any one of a stereo method, a time-of-flight (ToF) method, a structured pattern method, or a combination of two or more methods. The driver detection operation of the gesture detector 114 will be described in more detail with reference to FIG. 2.

The controller 102 may be configured to generate a control signal for operating the manipulation target object based on the information regarding the manipulation target object generated by the gesture detector 114 and the voice command generated by a voice recognizer 212, and transmit or transfer the control signal to the manipulation target object. For this purpose, the controller 102 may be configured to secure the voice commands for each of the manipulation target objects in the form of a database in advance.

Figure 2:
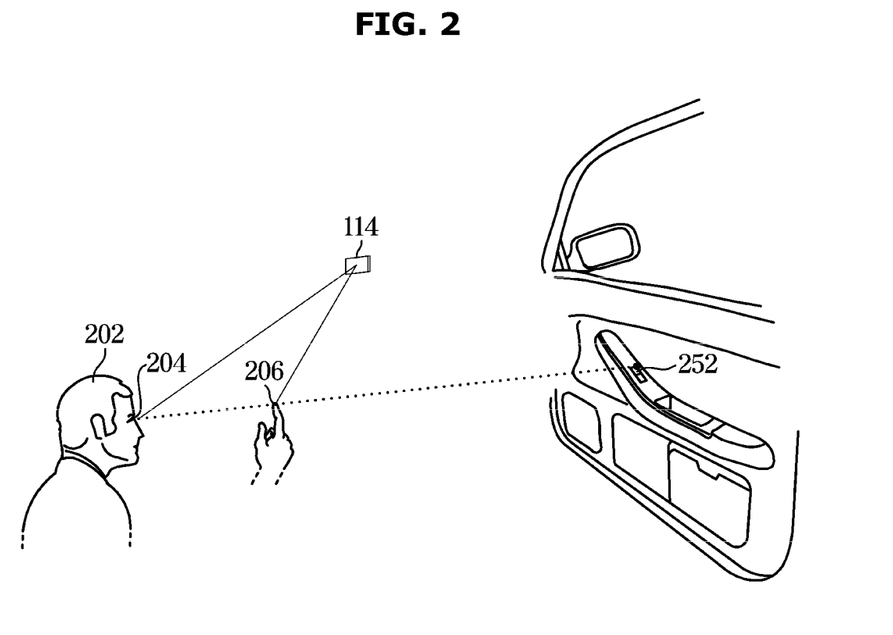
FIG. 2 is a view illustrating an operation of a gesture detector of a vehicle according to an exemplary embodiment of the present invention.

FIG. 2 is a view illustrating an operation of a gesture detector of a vehicle according to an exemplary embodiment of the present invention. As described above, the gesture detector 114 may be the 3D camera.

As shown in FIG. 2, in a multi-modal interface of the vehicle according to an exemplary embodiment of the present invention, the controller 102 may be configured to identify the manipulation target object (e.g., a window up/down button 252) based on the position and posture of the driver 202, and identify a pattern of operation that the driver intends from the voice command generated by the driver's speech (utterance). The manipulation target object may be, for example, a device positioned on an extended line of a straight line that virtually connects an eye of the driver 202 and a fingertip 206a of a specific finger 206 of the driver 202. For this purpose, the manipulation target object may be set to be designated through a gesture of the driver 202, and a position (coordinate) of the manipulation target object may be stored in advance. For example, by securing and registering the position (coordinates) of the multimedia device and a door lock switch, the window up/down button, an indoor light switch, an air conditioning switch, and the like, the manipulation target object that the driver 202 intends to operate may be identified from a coordinate of the device indicated by the driver 202.

For example, the gesture detector 114 may be configured to detect the position and posture of the driver 202 using a 3D image to identify the manipulation target object designated by the driver 202. In other words, the gesture detector 114 may be configured to detect the position of an eye (or eyes) 204 of the driver 202, the position of the fingertip 206a of the specific finger 206 of the driver 202, and the posture (shape) of the specific finger 206 of the driver 202 by analyzing the 3D image. In FIG. 2, the driver 202, with his/her right hand index finger 206 facing up, the eye 204 of the driver 202, the fingertip 206a of the index finger 206 of the driver 202, and the window up/down button 252 coincide on a virtual straight line. In FIG. 2, the window up/down button 252 is the manipulation target object intended by the driver 202.

The gesture detector 114 may be configured to detect the position and posture of the driver 202, more specifically, the eye 204 of the driver 202, and the fingertip 206a of the upright index finger 206 facing up by the analysis of the 3D image, and identify that the window up/down button 252 is the manipulation target object which the driver 202 intended from such information regarding the position and attitude of the driver 202. The window up/down button 252 may be located at the end of a straight extension line that virtually connects the eye 204 and the fingertip 206a of the right hand index finger 206 of the driver 202. The manipulation target information generated by the gesture detector 114 may be transferred to the controller 102.

The position and posture of the driver 202, which is the basis for identifying the manipulation target object intended by the driver 202, are not limited to the eye 204 and the specific postures of the specific fingers 206 of the driver 202, and may be replaced with a position and a posture of other body parts of the driver 202. For example, the driver 202 may designate the manipulation target object by a left thumb of the driver 202 facing upward, or extending a right hand index finger of the driver 202 toward the manipulation target object which the driver 202 intended.

As described above, when the driver 202 designates the manipulation target object through the gesture, and generates the voice command through an utterance, the manipulation target object indicated by the driver 202 may be operated according to the voice command.

Figure 3:
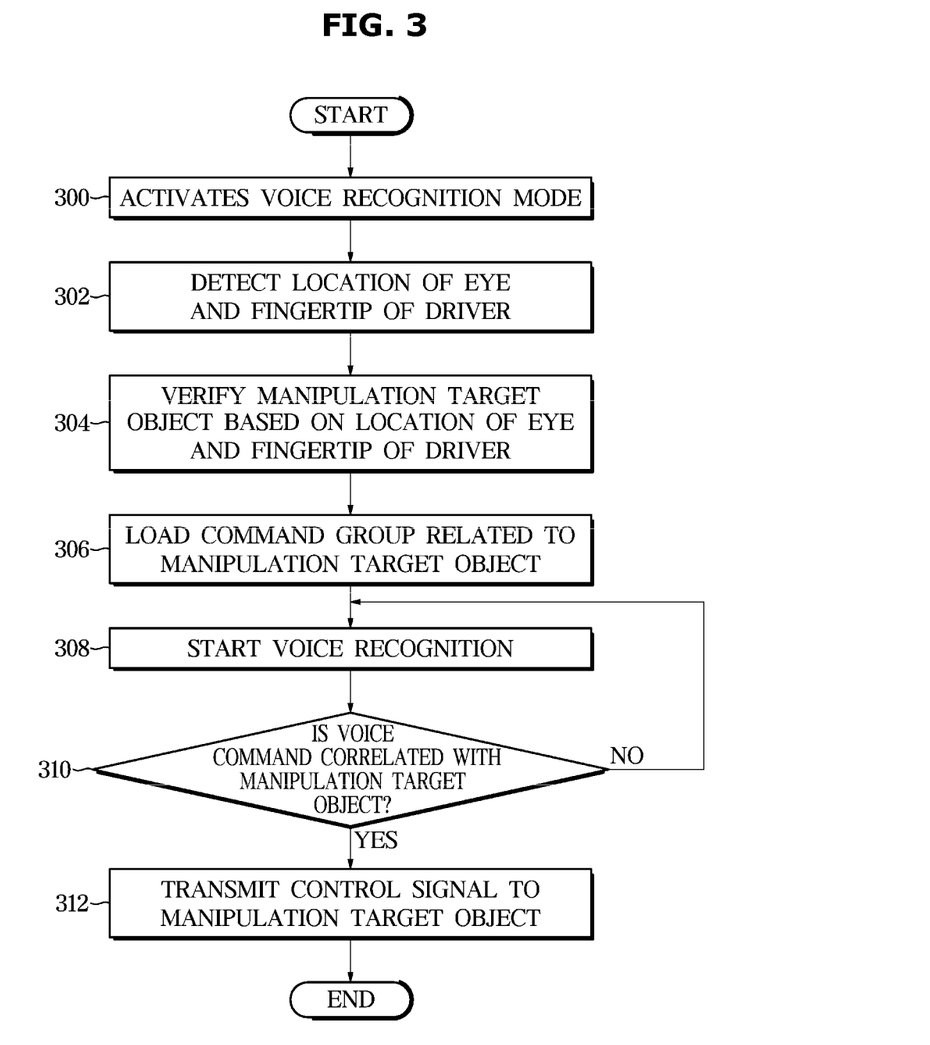
FIG. 3 is a view illustrating a control method of a vehicle according to an exemplary embodiment of the present invention.

FIG. 3 is a view illustrating a control method of a vehicle according to an exemplary embodiment of the present invention. As shown in FIG. 3, in the control method of the vehicle according to an exemplary embodiment of the present invention, the controller 102 may be configured to identify the manipulation target object from the information of the manipulation target object obtained from the position and posture of the driver 202, and operate the manipulation target object based on the voice command obtained from the driver's speech.

The driver 202 may activate a voice recognition mode to operate the manipulation target object using a voice command (300). In particular, to activate the voice recognition mode, the driver 202 may manipulate a button (not shown) equipped for activation of the voice recognition mode, or the driver 202 may utter a reserved or stored word or phrase for the activation of the voice recognition mode. After the voice recognition mode is activated, the gesture detector 114 may be configured to detect the position (coordinate) of each of the eyes (or eye) 204 and the fingertip 206a of the hand 206 of the driver 202 by the analysis of the 3D image of the driver 202 (302).

In addition, the gesture detector 114 may be configured to determine the manipulation target object based on the position (coordinate) of each of the eyes 204 and the fingertip 206a of the hand 206 of the driver 202 obtained by the analysis of the 3D image (304). For example, as shown in FIG. 2 described above, the gesture detector 114 may be configured to detect the position and posture of the driver 202, more specifically, the eye of the driver 202, and the fingertip 206a of the upright index finger 206 facing up by the analysis of the 3D image, and identify that the window up/down button 252 is the manipulation target object which the driver 202 intended from such information regarding the position and attitude of the driver 202. The window up/down button 252 is located at the end of a straight extension line that virtually connects the eye 204 and the fingertip 206a of the right hand index finger 206 of the driver 202.

When recognition of the manipulation target object is completed by the analysis of the position and posture (gesture) of the driver 202, the controller 102 may be configured to load a command group related to the manipulation target object from the voice command database (306). For example, when the window up/down button 252 is identified as the manipulation target object, the controller 102 may be configured to load a voice command group related to the window up/down button 152 from the voice command database. The voice command related to the window up/down button 152 may include 'up (or close)' and 'down (or open).'

When the driver 202 generates a voice signal by speech for operating the manipulation target object, the voice recognizer 212 may be configured to recognize the voice command by receiving and analyzing the voice signal generated by the driver 202, and transmit the voice command to the controller 102 (308). The controller 102 may be configured to verify whether the corresponding voice command is correlated with the manipulation target object based on the information of the manipulation target object provided from the gesture detector 114 and the voice command provided from the voice recognizer 112 (310). For example, when a designated manipulation target object is the window up/down button 252, the controller 102 may be configured to verify whether the voice command is for operating the window up/down button 252.

When the corresponding voice command is correlated with the manipulation target object (YES in 310), the controller 102 may be configured to transmit a control command to the manipulation target object to control the voice command at the manipulation target object (312). For example, when the manipulation target object is the window up/down button 252 and the voice command is 'down (open),' the controller 102 may be configured to transmit the control command that corresponds to 'down (open)' to the window up/down button 252 to open the window. In contrast, when the voice command is not correlated with the manipulation target object (NO in 310), the controller 102 may return to the stage 308 where the voice commands are recognized and wait for re-input of the voice command.

Through the control method as shown in FIG. 3, the controller 102 may be configured to identify the manipulation target object from the information of the manipulation target object obtained from the position and posture of the driver 202, and operate the manipulation target object based on the voice command obtained from the driver's speech.

Figure 4:
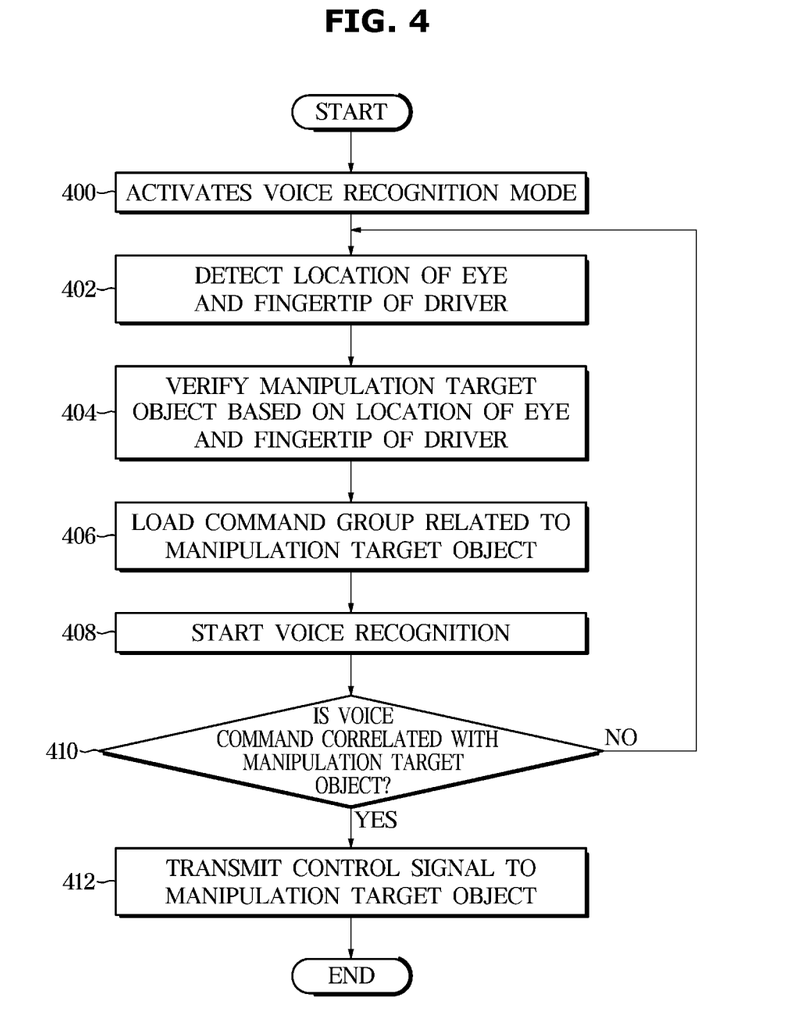
FIG. 4 is a view illustrating a control method of a vehicle according to another exemplary embodiment of the present invention.

FIG. 4 is a view illustrating a control method of a vehicle according to another exemplary embodiment of the present invention. As shown in FIG. 3, in the control method of the vehicle according to an exemplary embodiment of the present invention, the controller 102 may be configured to identify the manipulation target object from the information of the manipulation target object obtained from the position and posture of the driver 202, and operate the manipulation target object based on the voice command obtained from the driver's speech.

Further, the driver 202 activates the voice recognition mode to operate the manipulation target object using a voice command (400). To activate the voice recognition mode, the driver 202 may manipulate the button (not shown) equipped for the activation of the voice recognition mode, or the driver 202 may utter a reserved or stored word or phrase for the activation of the voice recognition mode. After the voice recognition mode is activated, the gesture detector 114 may be configured to detect the position (coordinate) of each of the eyes (or eye) 204 and the fingertip 206a of the hand 206 of the driver 202 by the analysis of the 3D image of the driver 202 (402).

In addition, the gesture detector 114 may be configured to determine the manipulation target object based on the position (coordinate) of each of the eyes 204 and the fingertip 206a of the driver 202 obtained by the analysis of the 3D image (404). For example, as shown in FIG. 2 described above, the gesture detector 114 may be configured to detect the position and posture of the driver 202, more specifically, the eye of the driver 202, and the fingertip 206a of the upright index finger 206 facing up by the analysis of the 3D image, and identify that the window up/down button 252 is the manipulation target object which the driver 202 intended from such information regarding the position and attitude of the driver 202. The window up/down button 252 is located at the end of a straight extension line that virtually connects the eye 204 and the fingertip 206a of the right hand index finger 206 of the driver 202.

When recognition of the manipulation target object is completed by the analysis of the position and posture (gesture) of the driver 202, the controller 102 may be configured to load a command group related to the manipulation target object from the voice command database (406). For example, when the window up/down button 252 is identified as the manipulation target object, the controller 102 may be configured to load a voice command group related to the window up/down button 152 from the voice command database. The voice command related to the window up down button 152 may include 'up (or close)' and 'down (or open).'

When the driver 202 generates a voice signal by speech for operating the manipulation target object, the voice recognizer 212 may be configured to recognize the voice command by receiving and analyzing the voice signal generated by the driver 202, and transmit the voice command to the controller 102 (408). The controller 102 may be configured to verify whether the corresponding voice command is correlated with the manipulation target object based on the information regarding the manipulation target object provided from the gesture detector 114 and the voice command provided from the voice recognizer 112 (410). For example, when a designated manipulation target object is the window up/down button 252, the controller 102 may be configured to verify whether the voice command is for controlling of the window up/down button 252.

When the corresponding voice command is correlated with the manipulation target object (YES in 310), the controller 102 may be configured to transmit a control command to the manipulation target object to control the voice command at the manipulation target object (412). For example, when the manipulation target object is the window up/down button 252 and the voice command is 'down (open),' the controller 102 may be configured to transmit the control command corresponding to 'down (open)' to the window up/down button 252 to open the window.

In contrast, when the voice command is not correlated with the manipulation target object (NO in 410), the controller 102 may return to the stage 402 where the positions of the eyes 204 and the fingertip 206a of the driver 202 is detected, respectively, and wait for redetection of the gesture and re-entry of the voice command. The discordance of the voice command and the manipulation target object may be caused by either an invalid voice command or an incorrect designation of the manipulation target object. Therefore, controller 202 may return to the stage 402 for recognition of the manipulation target object as designated by the driver 202 and perform both the detection of gestures and the receipt of voice commands from the driver 202 again to ensure a correct designation of the manipulation target object and a generation of voice commands. Accordingly, precise designation of the manipulation target object and correct generation of the voice command may be performed.

Through the control method as shown in FIG. 4, the controller 102 may be configured to identify the manipulation target object from the information regarding the manipulation target object obtained from the position and posture of the driver 202, and operate the manipulation target object based on the voice command obtained from the driver's speech.

Figure 5:
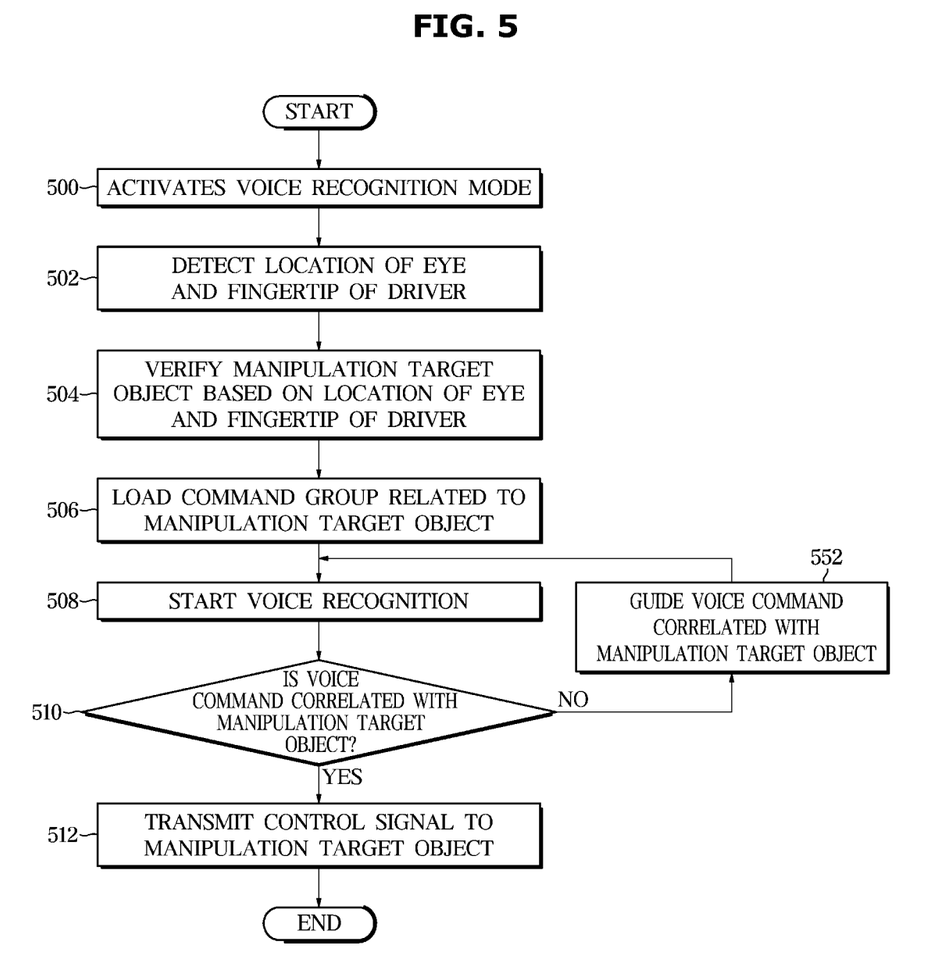
FIG. 5 is a view illustrating a control method of a vehicle according to yet another exemplary embodiment of the present invention.

FIG. 5 is a view illustrating a control method of a vehicle according to yet another exemplary embodiment of the present invention. As shown in FIG. 5, in the control method of the vehicle according to an exemplary embodiment of the present invention, the controller 102 may be configured to identify the manipulation target object from the information of the manipulation target object obtained from the position and posture of the driver 202, and operate the manipulation target object based on the voice command obtained from the driver's speech.

The driver 202 activates the voice recognition mode to operate the manipulation target object using a voice command (500). Particularly, to activate the voice recognition mode, the driver 202 may manipulate the button (not shown) equipped for the activation of the voice recognition mode, or the driver 202 may utter a reserved or stored word or phrase for the activation of the voice recognition mode. After the voice recognition mode is activated, the gesture detector 114 may be configured to detect the position (coordinate) of each of the eyes (or eye) 204 and the fingertip 206a of the driver 202 by the analysis of the 3D image of the driver 202 (502).

In addition, the gesture detector 114 may be configured to determine the manipulation target object based on the position (coordinate) of each of the eyes 204 and the fingertip 206a of the driver 202 obtained by the analysis of the 3D image (504). For example, as shown in FIG. 2 described above, the gesture detector 114 may be configured to detect the position and posture of the driver 202, more specifically, the eye of the driver 202, and the fingertip of the upright index finger 206 facing up by the analysis of the 3D image, and identify that the window up/down button 252 is the manipulation target object which the driver 202 intended from such information regarding the position and attitude of the driver 202. The window up/down button 252 is located at the end of a straight extension line that virtually connects the eye 204 and the fingertip 206a of the right hand index finger 206 of the driver 202.

When recognition of the manipulation target object is completed by the analysis of the position and posture (gesture) of the driver 202, the controller 102 may be configured to load a command group related to the manipulation target object from the voice command database (506). For example, when the window up/down button 252 may be identified as the manipulation target object, the controller 102 lo may be configured to load ads a voice command group related to the window up/down button 152 from the voice command database. The voice command related to the window up/down button 152 may include 'up (or close)' and 'down (or open).' When the driver 202 generates a voice signal by speech for operating the manipulation target object, the voice recognizer 212 may be configured to recognize the voice command by receiving and analyzing the voice signal generated by the driver 202, and transmit the voice command to the controller 102 (508).

The controller 102 may be configured to verify whether the corresponding voice command is correlated with the manipulation target object based on the information regarding the manipulation target object provided from the gesture detector 114 and the voice command provided from the voice recognizer 112 (510). For example, when a designated manipulation target object is the window up/down button 252, the controller 102 may be configured to verify whether the voice command is for controlling of the window up/down button 252.

When the corresponding voice command is correlated with the manipulation target object (YES in 510), the controller 102 may be configured to transmit a control command to the manipulation target object to control the voice command at the manipulation target object (512). For example, when the manipulation target object is the window up/down button 252 and the voice command is 'down (open),' the controller 102 may be configured to transmit the control command corresponding to 'down (open)' to the window up/down button 252 to open the window.

In contrast, when the voice command is not correlated with the manipulation target object (NO in 510), the controller 102 may return to the stage 508 where the voice commands are recognized and wait for re-input of the voice command. However, before returning to the voice command recognition stage 508, the controller 102 may be configured to provide the driver 202 with a guide for generating the correct voice command correlated with the manipulation target object (552). In other words, when the designated manipulation target object and the generated voice command are not correlated with each other at all, or when the generated voice command seems to be correlated with the manipulation target object but not accurate enough to verify, the controller 102 may be configured to guide the driver 202 to generate the correct voice command correlated with the up/down of the window.

For example, the controller 102 may be configured to output a reminder to the driver 202 that the currently designated manipulation target object is the window up/down button 252, provide an example of the voice command correlated with the window up/down button 252, and guide the driver 202 to generate the correct voice command for the control of the window up down button 252. The driver 202 may then generate the correct voice command for controlling the window up/down button 252 with reference to the guide of the controller 102.

Through the control method as shown in FIG. 5, the controller 102 may be configured to identify the manipulation target object from the information of the manipulation target object obtained from the position and posture of the driver 202, and operate the manipulation target object based on the voice command obtained from the driver's speech.

Figure 6:
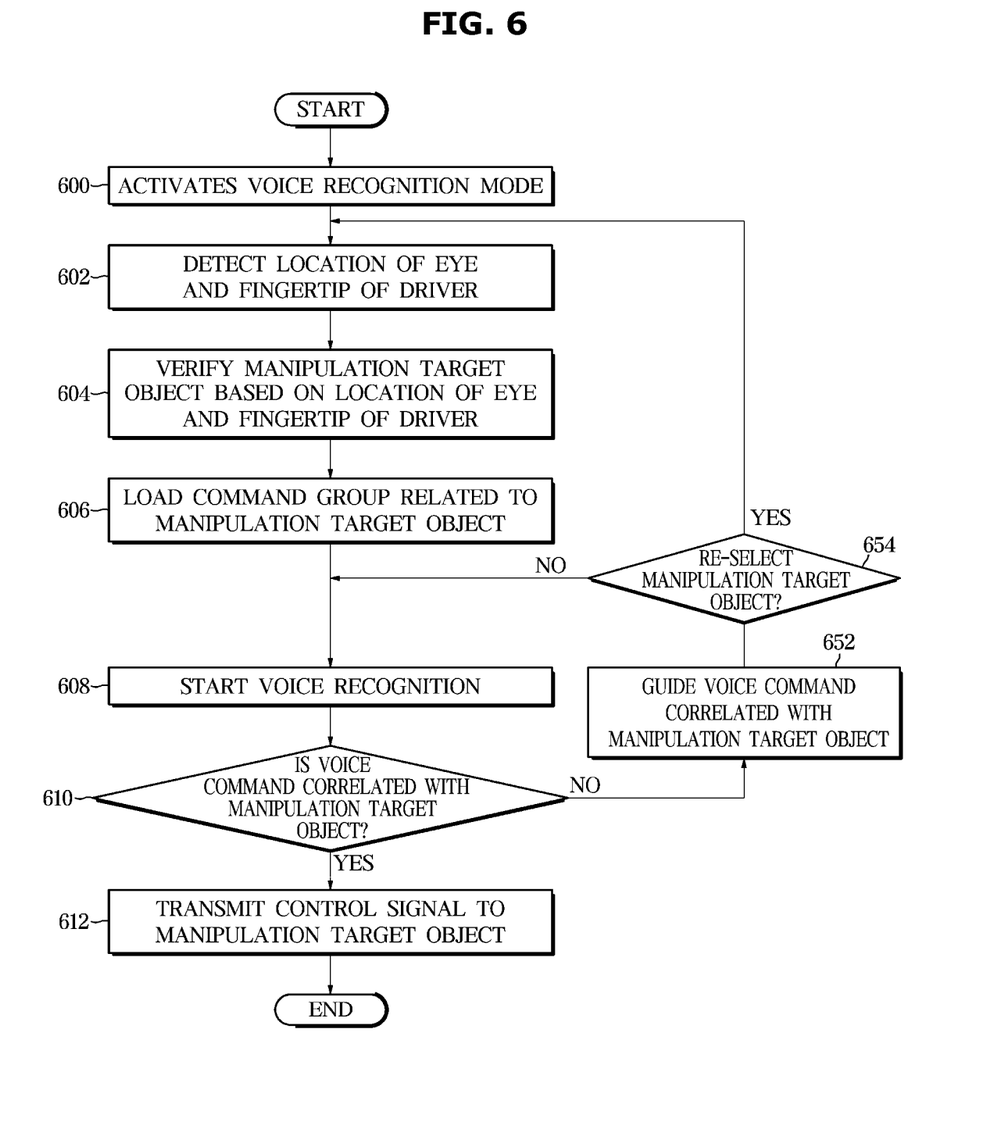
FIG. 6 is a view illustrating a control method of a vehicle according to yet another exemplary embodiment of the present invention.

FIG. 6 is a view illustrating a control method of a vehicle according to yet another exemplary embodiment of the present invention. As shown in FIG. 6, in the control method of the vehicle according to an exemplary embodiment of the present invention, the controller 102 may be configured to identify the manipulation target object from the information of the manipulation target object obtained from the position and posture of the driver 202, and operate the manipulation target object based on the voice command obtained from the driver's speech.

The driver 202 may activate the voice recognition mode to operate the manipulation target object using a voice command (500). To activate the voice recognition mode, the driver 202 may manipulate the button (not shown) equipped for the activation of the voice recognition mode, or the driver 202 may utter a reserved or stored word or phrase for the activation of the voice recognition mode. After the voice recognition mode is activated, the gesture detector 114 may be configured to detect the position (coordinate) of each of the eyes (or eye) 204 and the fingertip 206a of the driver 202 by the analysis of the 3D image of the driver 202 (502).

In addition, the gesture detector 114 may be configured to determine the manipulation target object based on the position (coordinate) of each of the eyes 204 and the fingertip 206a of the driver 202 obtained by the analysis of the 3D image (504). For example, as shown in FIG. 2 described above, the gesture detector 114 may be configured to detect the position and posture of the driver 202, more specifically, the eye 204 of the driver 202, and the fingertip of the upright index finger 206 facing up by the analysis of the 3D image, and identify that the window up/down button 252 is the manipulation target object which the driver 202 intended from such information regarding the position and attitude of the driver 202. The window up/down button 252 is located at the end of a straight extension line that virtually connects the eye 204 and the fingertip 206a of the right hand index finger 206 of the driver 202.

When recognition of the manipulation target object is completed by the analysis of the position and posture (gesture) of the driver 202, the controller 102 may be configured to load a command group related to the manipulation target object from the voice command database (506). For example, when the window up/down button 252 is identified as the manipulation target object, the controller 102 may be configured to load a voice command group related to the window up/down button 152 from the voice command database. The voice command related to the window up/down button 152 may include 'up (or close)' and 'down (or open).'

When the driver 202 generates a voice signal by speech for operating the manipulation target object, the voice recognizer 212 may be configured to recognize the voice command by receiving and analyzing the voice signal generated by the driver 202, and transmit the voice command to the controller 102 (508). The controller 102 may be configured to verify whether the corresponding voice command is correlated with the manipulation target object based on the information regarding the manipulation target object provided from the gesture detector 114 and the voice command provided from the voice recognizer 112 (510). For example, when a designated manipulation target object is the window up/down button 252, the controller 102 may be configured to verify whether the voice command is for controlling of the window up/down button 252.

When the corresponding voice command is correlated with the manipulation target object (YES in 510), the controller 102 may be configured to transmit a control command to the manipulation target object to control the voice command at the manipulation target object (512). For example, when the manipulation target object is the window up/down button 252 and the voice command is 'down (open),' the controller 102 may be configured to transmit the control command corresponding to 'down (open)' to the window up/down button 252 to open the window.

In contrast, when the voice command is not correlated with the manipulation target object (NO in 510), the controller 102 may return to the stage 508 where the voice commands are recognized and wait for re-input of the voice command. However, before returning to the voice command recognition stage 508, the controller 102 may be configured to provide the driver 202 with a guide for generating the correct voice command correlated with the manipulation target object (552). In other words, when the designated manipulation target object and the generated voice command are not correlated with each other at all, or when the generated voice command seems to be correlated with the manipulation target object but not accurate enough to verify, the controller 102 may be configured to guide the driver 202 to generate the correct voice command correlated with the up/down of the window.

For example, the controller 102 may be configured to output a reminder to the driver 202 that the currently designated manipulation target object is the window up/down button 252, provide an example of the voice command correlated with the window up/down button 252, and guide the driver 202 to generate the correct voice command for the control of the window up/down button 252. The driver 202 may generate the correct voice command for controlling the window up/down button 252 with reference to the guide of the controller 102.

In addition, after guiding the driver 202 to generate the correct voice command correlated with the manipulation target object, the controller 102 may be configured to verify whether the driver 202 will re-designate the manipulation target object (654). If the driver 202 will re-designate the manipulation target object (YES in 654), the controller 102 may return to the stage 402 where the positions of the eyes 204 and the fingertip 206a of the driver 202 is detected, respectively, and wait for redetection of the gesture and re-entry of the voice command. In contrast, if the driver 202 will not re-designate the manipulation target object (NO in 654), the controller 102 may return to stage 608 where the voice commands are recognized and wait for re-input of the voice command.

The discordance of the voice command and the manipulation target object may be caused by either an invalid voice command or an incorrect designation of the manipulation target object. Therefore, the controller 202 may selectively return to the stage 602 for recognition of the manipulation target object as designated by the driver 202 or to the stage 608 for generating the voice command, and perform both the detection of gestures and the receipt of voice commands from the driver 202 again to ensure a correct designation of the manipulation target object and a generation of voice commands. Accordingly, one of re-designating the manipulation target object and re-input of the voice command may be executed more rapidly and more accurately.

Through the control method as shown in FIG. 6, the controller 102 may be configured to identify the manipulation target object from the information regarding the manipulation target object obtained from the position and posture of the driver 202, and operate the manipulation target object based on the voice command obtained from the driver's speech.

The above description of the present invention is for illustrative purposes, and a person having ordinary skilled in the art should appreciate that other specific modifications may be easily made without departing from the technical spirit or essential features of the present invention. Therefore, the above embodiments should be regarded as illustrative rather than limitative in all aspects. The scope of the invention is not to be limited by the detailed description set forth above, but by the accompanying claims of the present invention, and it should also be understood that all changes or modifications derived from the definitions and scope of the claims and their equivalents fall within the scope of the present invention.

What is claimed is:

1. A vehicle, comprising:
    a gesture detector configured to detect a gesture of a driver to designate a manipulation target object;
    a voice recognizer configured to recognize a voice command generated by the driver to operate the designated manipulation target object; and
    a controller configured to:
        transmit a control signal that corresponds to the voice command to the manipulation target object;
        operate the manipulation target object to perform an operation that corresponds to the voice command; and
        guide the driver to select either re-input of the voice command or re-detection of the gesture when the manipulation target object and the voice command are in discord with each other.

2. The vehicle according to claim 1, wherein the gesture detector is a three dimensional (3D) camera configured to detect a position and a posture of the driver.

3. The vehicle according to claim 2, wherein the gesture detector is configured to detect positions and postures of at least two different body parts of the driver.

4. The vehicle according to claim 3, wherein the gesture detector is configured to detect the manipulation target object located on an extension line of a straight line that virtually connects the at least two different body parts of the driver.

5. The vehicle according to claim 3, wherein the at least two different body parts of the driver include an eye and a hand of the driver.

6. A method of controlling a vehicle, comprising:
    detecting, by a gesture detector, a gesture of a driver to designate a manipulation target object;
    recognizing, by a voice recognizer, a voice command generated by the driver to operate the designated manipulation target object;
    transmitting, by a controller, a control signal that corresponds to the voice command to the manipulation target object, and operating the manipulation target object to perform an operation that corresponds to the voice command; and guiding, by the controller, the driver to select either re-input of the voice command re-detection of the gesture when the manipulation target object and the voice command are in discord with each other.

7. The method according to claim 6, wherein the detecting of the gesture includes detecting a position and a posture of the driver using a three-dimensional (3D) camera.

8. The method according to claim 7, wherein the detecting of the gesture includes detecting positions and postures of at least two different body parts of the driver.

9. The method according to claim 8, wherein the detecting of the gesture includes detecting the manipulation target object located on an extension line of a straight line that virtually connects the at least two different body parts of the driver.

10. The method according to claim 8, wherein the at least two different body parts of the driver include an eye and a hand of the driver.

11. The method according to claim 6, further comprising receiving the voice command again when the manipulation target object and the voice command are in discord with each other.

12. The method according to claim 6, further comprising detecting the gesture of the driver again when the manipulation target object and the voice command are in discord with each other.

13. The method according to claim 6, further comprising guiding the voice command correlated with the manipulation target object to the driver when the manipulation target object and the voice command are in discord with each other.

14. A vehicle, comprising:
a three-dimensional (3D) camera configured to detect a manipulation target object located on an extension line of a straight line that virtually connects an eye and a hand of a driver;
a voice recognizer configured to recognize a voice command generated by the driver to operate a designated manipulation target object; and
a controller configured to:
  transmit a control signal that corresponds to the voice command to the manipulation target object,
  operate the manipulation target object to perform an operation that corresponds to the voice command, and
  guide the driver to select either re-input of the voice command or re-detection of the gesture when the manipulation target object and the voice command are in discord with each other.

15. A method of controlling a vehicle, comprising:
starting, by a voice recognizer, a voice recognition operation;
detecting, by a gesture detector, a manipulation target object located on an extension line of a straight line that virtually connects an eye and a hand of a driver;
recognizing, by the voice recognizer, a voice command generated by the driver to operate a designated manipulation target object;
providing, by a controller, the voice command correlated with the manipulation target object to the driver, and guiding the driver to select at least one of re-input of the voice command and re-detection of a gesture to perform at least one of the voice recognition and the gesture detection; and
transmitting, by the controller, a control signal that corresponds to the voice command to the manipulation target object, and operating the manipulation target object to perform an operation that corresponds to the voice command, when the manipulation target object and the voice command correspond to each other.

* * * * *